United States Patent [19]

Giering et al.

[11] Patent Number: 4,782,924

[45] Date of Patent: Nov. 8, 1988

[54] INTERNAL SHOE DRUM BRAKE WITH TWO LINERS ON EACH LINING SUPPORT AND MEANS FOR REDUCTION IN WEARING-IN PERIOD

[75] Inventors: Wilfried T. Giering, Mendig; Sigmar H. Micke, Koblenz-Metternich; Franz-Helmut Holl, Mastershausen; Jörg Thielecke, Hillscheid, all of Fed. Rep. of Germany

[73] Assignee: Lucas Industries public limited company, Birmingham, England

[21] Appl. No.: 53,718

[22] Filed: May 26, 1987

[30] Foreign Application Priority Data

May 27, 1986 [DE] Fed. Rep. of Germany ... 8614259[U]

[51] Int. Cl.$^4$ .................. F16D 69/00; F16D 65/08
[52] U.S. Cl. .................. 188/250 A; 188/250 G; 188/250 B
[58] Field of Search ........... 188/250 A, 250 H, 250 B, 188/250 G, 250 E, 250 R, 73.1, 325, 362, 250 F; 192/107 R

[56] References Cited

U.S. PATENT DOCUMENTS

| | | | |
|---|---|---|---|
| 1,928,095 | 9/1933 | Dick | 188/78 |
| 2,167,607 | 7/1939 | Alden | 188/78 |
| 2,213,003 | 8/1940 | Heinzelman | 188/78 |
| 2,282,439 | 5/1942 | Tilden | 188/250 G |
| 2,690,820 | 10/1954 | Raes | 188/250 G |
| 2,924,303 | 2/1960 | Sampson | 188/250 G X |
| 3,894,620 | 7/1975 | Goldberg | 188/250 A X |
| 4,353,442 | 10/1982 | Correa | 188/250 F X |

FOREIGN PATENT DOCUMENTS 0066090 12/1982 European Pat. Off. .
2087995 6/1982 United Kingdom .

Primary Examiner—Douglas C. Butler
Attorney, Agent, or Firm—Schrivener and Clarke

[57] ABSTRACT

At least one brake shoe (14) comprising a lining support member (16) and two lining sections (20) fastened one behind the other in circumferential direction to the support member (16) is arranged in a brake drum (10) which has a circular cylindrical internal braking surface (12). Each lining section (20) has an at least approximately circular cylindrical friction surface (22) the radius of curvature (R22) of which is smaller than the radius of curvature (R12) of the braking surface (12) and the center of curvature (M22) of which is located such that only a center portion of the friction surface (22) engages the braking surface (12) upon actuation of the brake. In a rectangular coordinate system (X,Y) the origin of which lies on the axis (A) of the brake drum (10) and the abscissa (X) of which is formed by a center line between the two lining sections (20), the center of curvature (M22) of each friction surface (22) has a distance (y22) from the abscissa which is smaller than the distance (x22) from the ordinate upon actuation of the brake. This shortens the running-in period during which the friction surfaces (22) becomes adapted to the braking surface (12) of the brake drum (10).

4 Claims, 1 Drawing Sheet

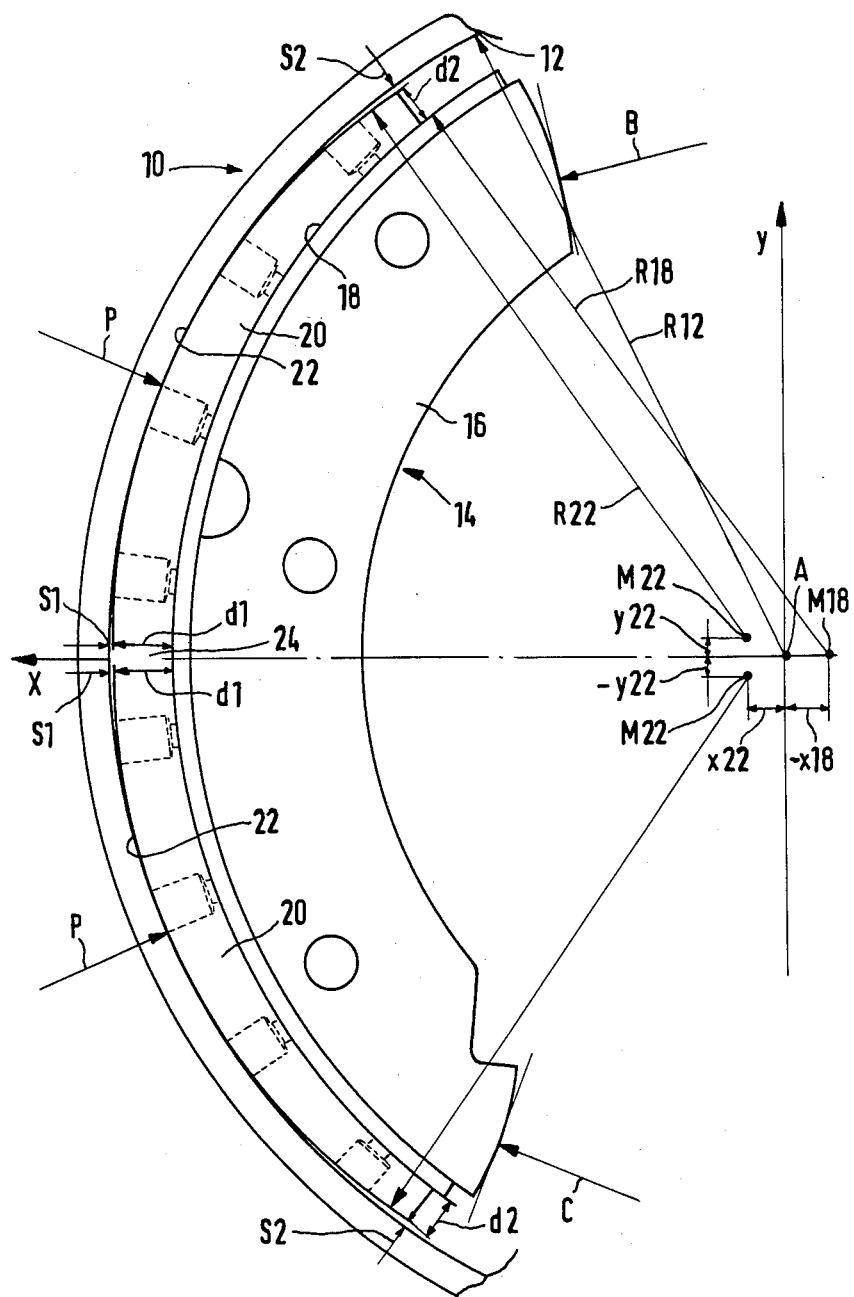

INTERNAL SHOE DRUM BRAKE WITH TWO LINERS ON EACH LINING SUPPORT AND MEANS FOR REDUCTION IN WEARING-IN PERIOD

The instant invention relates to an internal shoe drum brake, comprising a brake drum which has a circular cylindrical internal braking surface and at least one brake shoe which comprises a lining support member and two lining sections fastened one behind the other in circumferential direction to the support member, each lining section having an at least approximately circular cylindrical friction surface the radius of curvature of which is smaller than the radius of curvature of the braking surface and the center of curvature of which is located such that only a central portion of the friction surface engages the braking surface upon actuation of the brake.

It is desirable with internal shoe drum brakes that the friction surfaces enter into full engagement with the braking surface of the drum each time the brakes are actuated. For this desirable condition to be obtained, it is necessary that the radius of curvature of the friction surfaces be exactly conform with the radius of curvature of the braking surface of the drum and that the drum be not deformed either by pressure or temperature influences. However, the components of each internal shoe drum brake have unavoidable manufacturing tolerances which sum up as the individual parts are assembled. And then it must not be permitted that the radius of curvature of a friction surface at a brake shoe is greater than the radius of curvature of the braking surface at the drum because that would lead to the brake drum being contacted only by the front and rear edges of the friction surface. As a consequence, the ratio between the brake actuating force introduced and the circumferential force appearing during the retardation would become very great, and the brake might become locked.

For this reason the radius of curvature of the friction surfaces of all brake linings or lining sections under any circumstance must be so selected that it will be smaller than the radius of curvature of the braking surface at the drum, even under the most unfavorable coincidence of all the contributing manufacturing tolerances. In the case of brake linings, however, which extend at uniform curvature across the entire periphery of the associated support member, this has the disadvantageous consequence that the friction lining, as long as it is new, becomes effective during braking in its center part only. Therefore, the corresponding brake shoe will not reach its calculated peripheral force until gradually the lining has worn down and the radius of curvature of the friction surfaces has become adapted accordingly to the radius of curvature of the braking surface. Until then, during the so-called running-in of the friction linings, the transformation of energy during braking is concentrated in the middle range of the brake shoe which thus may become overheated and consequently form cracks.

To overcome these disadvantages, an internal shoe drum brake of the kind specified initially was developed (GB-A No. 2 087 995). Accordingly, the friction lining of at least one brake shoe was divided into two lining sections, each friction surface of which has its own radius of curvature, being smaller than the radius of curvature of the braking surface at the drum. In this manner the respective brake shoe is effective, from the very beginning, in the central portion of each of the two lining sections when the brake is applied. And each of these portions grows rather quickly as the linings continue to wear until, finally, the friction surfaces will be totally adapted to the radius of curvature of the braking surface at the drum.

It is an object of the invention to shorten the running-in period still further with an internal shoe drum brake, during which period the friction surfaces gradually become adapted to the braking surface of the drum, thereby permitting the brake to be manufactured with a wider range of tolerances.

This object is met, in accordance with the invention, with an internal shoe drum brake of the kind specified initially, in that, in a rectangular coordinate system the origin of which lies on the axis of the brake drum and the abscissa of which is formed by a center line between the two lining sections, the center of curvature of each friction surface has a distance from the abscissa which is smaller than the distance from the ordinate, upon actuation of the brake.

Thus, if a brake equipped with new brake linings is actuated, the lining sections fastened to a common support member define a narrower gap between their respective friction surface and the braking surface of the drum at their edges facing each other than at their ends which are remote from each other where edgewise contact between the friction lining and the braking surface of the drum must be avoided at all cost. The narrow gaps at first left open between the ends facing each other of the lining sections, become closed quickly as the linings wear down, whereby the calculated circumferential force on braking is reached rapidly.

In a preferred embodiment of the invention the distance from the abscissa at which the center of curvature of the friction surface of each lining section is located, is 0.4 to 0.6 times as great as the distance from the ordinate.

Finally it is advantageous if the support member of the brake lining in per se known manner has a circular outer periphery the radius of curvature of which is greater than the radius of curvature of the braking surface at the brake drum.

An embodiment of the invention will be described further below, with reference to a diagrammatic drawing.

The drawing shows part of a brake drum 10 which includes a circular cylindrical braking surface 12 having a radius of curvature R12. The origin of an imagined rectangular system of coordinates, including abscissa X and ordinate Y, is located on the axis A of the brake drum 10 from which axis the radius R12 starts.

Two brake shoes 14 of which only one is shown are coordinated with the brake drum 10. Each brake shoe 14 comprises a support member 16 formed of sheet steel into a T-shaped profile and having an outer periphery 18 the radius of curvature R18 of which is greater than the radius of curvature R12. This radius of curvature R18 consequently starts from a center of curvature M18 which is located beyond the ordinate Y, as seen from the brake shoe 14, and has the negative abscissa value −x18. The ordinate value of the center of curvature M18 is 0 since the periphery 18 is symmetrical with respect to the abscissa X.

Two lining sections 20 are fastened to the support member 16 of the brake shoe 4 illustrated. They are designed and arranged symmetrically with respect to the abscissa X. By virtue of the excess of R18 over R12 both lining sections 20 have the configuration of a bowed wedge which becomes narrower in the direction away from the abscissa X. Each lining section 20 has an at least approximately circular cylindrical friction surface 22 having a radius of curvature R22 which is smaller than the radius of curvature R12 of the braking surface 12 and which starts from a center of curvature M22 having the abscissa value x22. The ordinate values y22 and −y22 of the centers of curvature M22 are of the same magnitude but differ by their sign because the center of curvature M22 of the friction surface 22 positioned above the abscissa X lies above the abscissa, and vice versa.

The brake shoe 14 is shown as new, prior to any deformation of its components, specifically prior to any wear of the lining sections 20. As shown, the lining sections 20 have a thickness d1 at their ends facing each other, and this thickness is much greater than the thickness d2 at the ends remote from each other of the lining sections. Together the two lining sections 20 form a brake lining of sickel shape. They are made separately merely for purposes of simpler manufacture, and they are riveted to the lining support member 16 so that a small gap 24 is left open between them. The two lining sections 20 also could be made in one piece without any alteration of the configuration shown of their friction surfaces 22. In that event the gap 24 is bridged by friction material. The thickness of the bridge thus formed, however, should not exceed d1.

The drawing presents the brake shoe 14 in an operative position which it assumes when an actuating force B acts on one end of the lining support member 16, while the other end of the support member is supported by a supporting force C. The forces B and C are exactly of such magnitude that they will urge the friction surfaces 22 against the braking surface 12, causing reactive forces P at the same but not deforming any part of the brake shoe 14. Under these conditions a wedge-shaped gap of maximum width s1 is left free by the lining sections 20 at their ends facing each other, between their respective friction surface 22 and the braking surface 12. At the ends remote from each other of the lining sections 20 wedge-shaped gaps of maximum width s2 are left open between the friction surfaces 22 and the braking surface 12. In the position shown of the centers of curvature M22, in other words at a coordinate ratio of the same of y22:x22 in the order of 1:2, the gap width s1 is much smaller than the gap width s2. Therefore, the gaps of gap width s1 will disappear soon as the lining sections 20 begin to wear.

What is claimed is:

1. An internal shoe drum brake, comprising
   a brake drum (10) which has a circular cylindrical internal braking surface (12) and
   at least one brake shoe (14) which comprises a lining support member (16) and two lining sections (20) fastened one behind the other in circumferential direction to the support member (16),
   each lining section (20) having an at least approximately circular cylindrical friction surface (22) the radius of curvature (R22) of which is smaller than the radius of curvature (R12) of the braking surface (12) and the center of curvature (M22) of which is located such that only a central portion of the friction surface (22) engages the braking surface (12) upon actuation of the brake, the lining sections (20) of each brake shoe (14) having a fist thickness (d1) at their ends facing each other, and a second thickness (d2) at their ends remote from each other, the first thickness (d1) being substantially greater than the secnd thickness (d2), wherein in a rectangular coordinate system (X,Y) the origin of which lies on the axis (A) of the brake drum (10) and the abscissa (X) of which is formed by a center line between the two lining sections (20), the center of curvature (M22) of each friction surface (22) lies between that particular friction surface (22) and the axis (A) of the brake, the center of curvature (M22) having a distance (y22) from the abscissa which is smaller than the distance (X22) from the ordinate, upon actuation of the brake.

2. The internal shoe drum brake as claimed in claim 1, characterized in that the distance (y22) from the abscissa of the center of the curvature (M22) is from 0.4 to 0.6 times as great as the distance (x22) from the ordinate.

3. The internal shoe drum brake as claimed in claim 1 or 2, characterized in that the lining support member (16) in per se known manner has a circular outer periphery (18) the radius of curvature (R18) of which is greater than the radius of curvature (R12) of the braking surface (12) at the brake drum (10).

4. The internal shoe drum brake as claimed in claim 1, wherein upon actuation of the brake the gap width (S1) between the proximal ends of the linings and the drum is substantially smaller than the gap width (S2) at the distal ends of the liners.

* * * * *